United States Patent
Chun et al.

(10) Patent No.: US 10,088,953 B2
(45) Date of Patent: Oct. 2, 2018

(54) TOUCH SCREEN DISPLAY DEVICE AND DRIVING METHOD FOR CORRECTING TOUCH POSITION BASED ON IMAGE SHIFTING

(71) Applicant: SAMSUNG DISPLAY CO., LTD., Yongin-si, Gyeonggi-do (KR)

(72) Inventors: Byung Ki Chun, Yongin-si (KR); Jin Woo Noh, Yongin-si (KR); Jun Gyu Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 68 days.

(21) Appl. No.: 15/181,067

(22) Filed: Jun. 13, 2016

(65) Prior Publication Data
US 2017/0115821 A1   Apr. 27, 2017

(30) Foreign Application Priority Data
Oct. 22, 2015 (KR) .......................... 10-2015-0147305

(51) Int. Cl.
*G06F 3/041* (2006.01)
(52) U.S. Cl.
CPC .................................. *G06F 3/0418* (2013.01)
(58) Field of Classification Search
CPC .......... G06F 3/0418; G09G 2320/0257; G09G 2320/0261; G09G 2320/0266; G09G 2320/0285
See application file for complete search history.

(56) References Cited

U.S. PATENT DOCUMENTS

| | | | |
|---|---|---|---|
| 2004/0160455 A1* | 8/2004 | Weitbruch | G09G 3/2022 345/596 |
| 2011/0187661 A1* | 8/2011 | Wakizaka | G06F 3/041 345/173 |
| 2014/0043281 A1* | 2/2014 | Kim | G06F 3/044 345/174 |
| 2014/0218320 A1* | 8/2014 | Liu | G06F 3/0418 345/173 |
| 2016/0179269 A1 | 6/2016 | Chun et al. | |
| 2016/0320916 A1 | 11/2016 | Chun et al. | |
| 2016/0321973 A1 | 11/2016 | Chun et al. | |
| 2016/0329008 A1 | 11/2016 | Chun et al. | |

FOREIGN PATENT DOCUMENTS

| KR | 10-2016-0077510 | 7/2016 |
|---|---|---|
| KR | 10-2016-0129983 | 11/2016 |
| KR | 10-2016-0129985 | 11/2016 |
| KR | 10-2016-0132170 | 11/2016 |

* cited by examiner

*Primary Examiner* — Liliana Cerullo
(74) *Attorney, Agent, or Firm* — Lewis Roca Rothgerber Christie LLP

(57) ABSTRACT

A touch screen display device includes: an image corrector configured to generate second image data based on first image data and to generate a second lookup table based on a positional relationship between a first pixel driven corresponding to predetermined data in the first image data and a second pixel driven corresponding to the predetermined data in the second image data; a data driver configured to generate a data signal based on the second image data; a display panel comprising pixels configured to emit light with a brightness corresponding to the data signal; and a processor configured to correct a second touch position on the second pixel to a first touch position on the first pixel based on the second lookup table.

18 Claims, 11 Drawing Sheets

FIG. 15

| Px_No. | x_offset | y_offset |
|---|---|---|
| Px1 | 0 | 0 |
| Px2 | +1 | 0 |
| ⋮ | ⋮ | ⋮ |
| Pxk | 0 | 0 |

LUT2

FIG. 16

START

GENERATE SECOND IMAGE DATA DISPLAYED ON SECOND PIXEL ON THE BASIS OF FIRST IMAGE DATA DISPLAYED ON FIRST PIXEL —S100

GENERATE SECOND LOOKUP TABLE BY USING POSITIONAL RELATIONSHIP BETWEEN FIRST PIXEL AND SECOND PIXEL —S110

CORRECT SECOND TOUCH POSITION ON SECOND PIXEL INTO FIRST TOUCH POSITION ON FIRST PIXEL ON THE BASIS OF POSITIONAL RELATIONSHIP INCLUDED IN SECOND LOOKUP TABLE —S120

END

TOUCH SCREEN DISPLAY DEVICE AND DRIVING METHOD FOR CORRECTING TOUCH POSITION BASED ON IMAGE SHIFTING

CROSS-REFERENCE TO RELATED APPLICATION

This application claims priority to and the benefit of Korean Patent Application No. 10-2015-0147305, filed on Oct. 22, 2015, and in the Korean Intellectual Property Office, the entire content of which is incorporated herein by reference.

BACKGROUND

1. Field

Aspects of embodiments of the present invention generally relate to a touch screen display device and a driving method thereof.

2. Description of the Related Art

Recently, various types of display devices, such as organic light emitting displays, liquid crystal display devices, and plasma display devices, are in widespread use.

When these display devices output a predetermined image or characters for a long time, particular pixels may deteriorate to generate an afterimage.

To avoid the generation of the afterimage, pixel shifting technology is being used by periodically moving an image when displaying the image on a display panel. When an image is moved at a predetermined period when displayed on the display panel, the same data may not be output to the same pixels for a long time, which may reduce or prevent the deterioration of pixels.

For example, a display device may generate new image data by interpolating image data before movement and image data after movement by pixel shifting technology. However, to generate the new image data, the display device may need to separately store the image data before movement and the image data after movement in a memory, which may lead to increase in manufacturing costs.

The above information discussed in this Background section is only for enhancement of understanding of the background of the described technology and therefore it may contain information that does not constitute prior art that is already known to a person having ordinary skill in the art.

SUMMARY

Aspects of some example embodiments of the present invention include a touch screen display device that may prevent or reduce deterioration of a pixel by moving an image by a pixel shift operation to prevent an afterimage, and a driving method thereof.

In addition, aspects of some example embodiments of the present invention include a touch screen display device that may improve accuracy of a touch operation intended by a user by matching a moved image with a touch position corresponding thereto, and a driving method thereof.

In addition, aspects of some example embodiments of the present invention include a touch screen display device that may reduce time taken to recognize a touch position, and a driving method thereof.

According to some example embodiments of the present invention, a touch screen display device may include: an image corrector configured to generate second image data based on first image data and to generate a second lookup table based on a positional relationship between a first pixel driven corresponding to predetermined data in the first image data and a second pixel driven corresponding to the predetermined data in the second image data; a data driver configured to generate a data signal based on the second image data; a display panel comprising pixels configured to emit light with a brightness corresponding to the data signal; and a processor configured to correct a second touch position on the second pixel to a first touch position on the first pixel based on the second lookup table.

According to some embodiments, the image corrector includes: an image converter configured to generate the second image data based on the first image data and a first lookup table comprising a shift direction and a shift amount of an image, and pixel shift amount information by calculating a distance and a direction in which the second pixel is separated from the first pixel; and a lookup table generator configured to define the first touch position and the second touch position based on the pixel shift amount information and to generate the second lookup table according to a defined positional relationship therebetween.

According to some embodiments, the image converter is configured to calculate a number of inputs of the first image data and to determine the shift direction and the shift amount of the image in the first lookup table according to the number of inputs.

According to some embodiments, the image converter is configured to divide the image into a plurality of regions, and to set a first region among the plurality of regions as a reduced region, a second region as an enlarged region, and a third region between the first region and the second region as a shift region.

According to some embodiments, the image converter is configured to reduce the first region at a predetermined first ratio, to enlarge the second region at a predetermined second ratio, and to shift the third region in a direction in which the first region is reduced.

According to some embodiments, the image converter is configured to set a first x-axis touch coordinate and a first y-axis touch coordinate as an x-axis coordinate and a y-axis coordinate of the first touch position, respectively, and a second x-axis touch coordinate and a second y-axis touch coordinate as an x-axis coordinate and a y-axis coordinate of the second touch position, respectively.

According to some embodiments, the image converter is configured to calculate an x-axis touch shift amount and a y-axis touch shift amount by using the first x-axis touch coordinate, the first y-axis touch coordinate, the second x-axis touch coordinate, and the second y-axis touch coordinate, and to generate the pixel shift amount information comprising the x-axis touch shift amount and the y-axis touch shift amount.

According to some embodiments, the image converter is configured to calculate the x-axis touch shift amount according to an equation $x\_offset = xt1 - xt2$, where the $x\_offset$ is the x-axis touch shift amount, the $xt1$ is the first x-axis touch coordinate, and the $xt2$ is the second x-axis touch coordinate.

According to some embodiments, the image converter is configured to calculate the y-axis touch shift amount according to an equation $y\_offset = yt1 - yt2$, where the $y\_offset$ is the y-axis touch shift amount, the $yt1$ is the first y-axis touch coordinate, and the $yt2$ is the second y-axis touch coordinate.

According to some embodiments, the lookup table generator is configured to generate the second lookup table based on the x-axis touch shift amount and the y-axis touch shift amount.

According to some embodiments, the lookup table generator is configured to generate the second lookup table whenever the second image data is generated.

According to some embodiments, the processor comprises a touch position corrector configured to correct the second touch position based on the second lookup table.

According to some embodiments, the touch position corrector is configured to correct the second touch position into the first touch position based on an x-axis touch shift amount and a y-axis touch shift amount included in the second lookup table.

According to some example embodiments of the present invention, in a method of driving a touch screen display device by correcting a touch position according to a shift of an image on a display panel, the method includes: generating second image data displayed on a second pixel based on first image data display on a first pixel; generating a second lookup table based on a positional relationship between the first pixel and the second pixel; and correcting a second touch position on the second pixel into a first touch position on the first pixel based on the positional relationship in the second lookup table.

According to some embodiments, the generating of the second image data comprises generating the second image data based on a first lookup table comprising a shift direction and a shift amount of the image based on the first image data.

According to some embodiments, the method further includes generating pixel shift amount information by calculating a distance and a direction in which the second pixel is separated from the first pixel.

According to some embodiments, the generating of the second lookup table comprises generating the second lookup table based on an x-axis touch shift amount and a y-axis touch shift amount included in the pixel shift amount information.

According to some embodiments, the correcting of the second touch position comprises correcting the second touch position into the first touch position by moving the second touch position in x-axis and y-axis directions according to the x-axis touch shift amount and the y-axis touch shift amount included in the second lookup table.

BRIEF DESCRIPTION OF THE DRAWINGS

Aspects of some example embodiments of the present invention will be described more fully herein with reference to the accompanying drawings. However, the present invention may be embodied in different forms and should not be construed as being limited to the embodiments described herein. Rather, the embodiments are provided so that the disclosure is more thorough and more complete, and will more fully convey the scope of the present invention to one of ordinary skill in the art.

In the drawings, dimensions may be exaggerated for clarity. It will be understood that when an element is referred to as being "between" two elements, the element may be the only element between the two elements, or with one or more intervening elements being present between the two elements. Like reference numerals refer to like elements throughout the specification.

FIG. 15 is a lookup table according to some example embodiments of the present invention.

FIG. 16 is a flowchart illustrating a driving method of a touch screen display device according to some example embodiments of the present invention.

DETAILED DESCRIPTION

Figure 1:
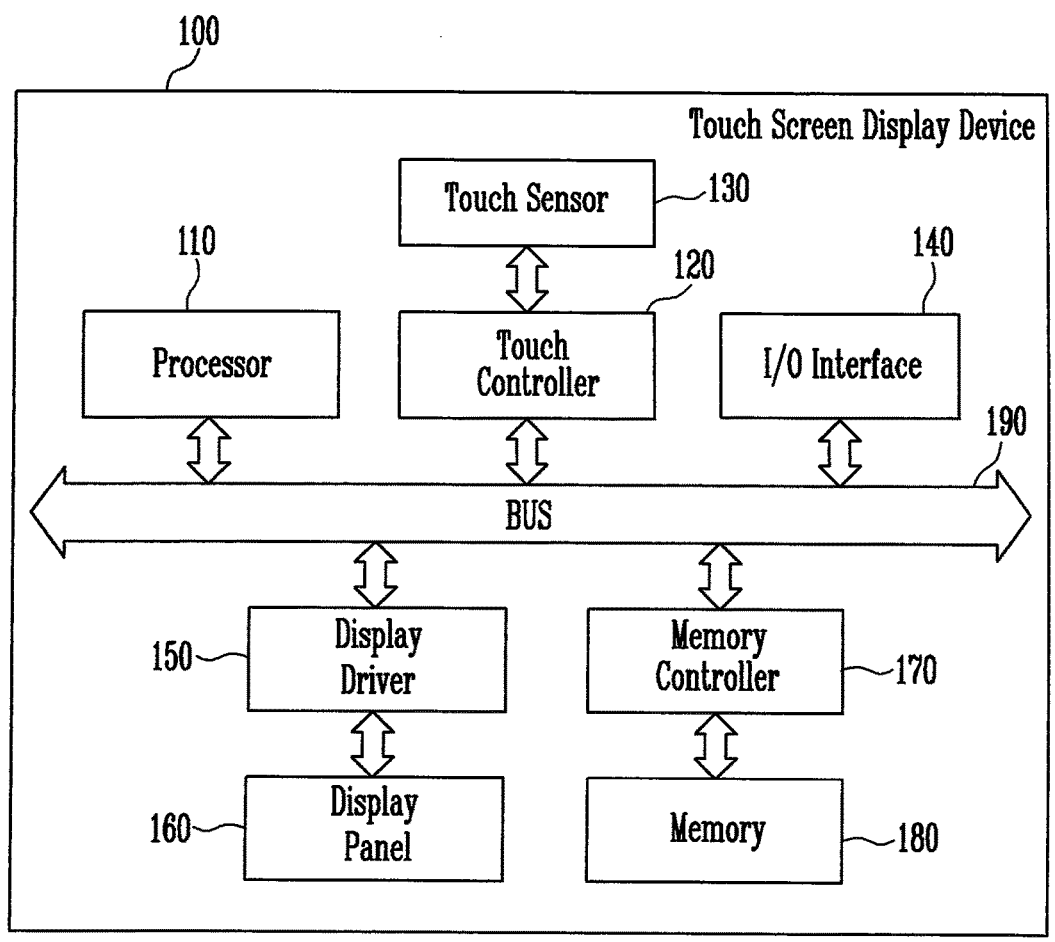
FIG. 1 is a block diagram of a touch screen display device according to some example embodiments of the present invention.

Aspects of some example embodiments of the present invention will now be described more fully hereinafter with reference to the accompanying drawings; however, the present invention may be embodied in different forms and should not be construed as being limited to the embodiments set forth herein. Rather, these embodiments are provided so that this disclosure will be more thorough and more complete, and will more fully convey the scope of present invention to those skilled in the art.

Because embodiments of the present invention may be variously modified and have various forms, some specific embodiments will be illustrated in the drawings and described in the detailed description. However it should be understood that the present invention is not limited to the specific embodiments, but includes all changes, equivalents, or alternatives which are included in the spirit and technical scope of the present invention.

In the description of respective drawings, similar reference numerals designate similar elements. In the accompanying drawings, sizes of structures are illustrated to be enlarged compared to actual sizes for clarity of embodiments of the inventive concept. Terms "first," "second" and the like may be used for describing various constituent elements, but the constituent elements should not be limited to the terms. The terms are used only to differentiate one constituent element from another constituent element. For example, a first element could be termed a second element, and similarly, a second element could be also termed a first element without departing from the scope of the present disclosure. Singular expressions used herein include plurals expressions unless they have definitely opposite meanings.

It will be understood that when an element or layer is referred to as being "on", "connected to", "coupled to", or "adjacent to" another element or layer, it can be directly on, connected to, coupled to, or adjacent to the other element or layer, or one or more intervening elements or layers may be present. In contrast, when an element or layer is referred to as being "directly on," "directly connected to", "directly coupled to", or "immediately adjacent to" another element or layer, there are no intervening elements or layers present.

In the present disclosure, it will be appreciated that terms "including" and "having" are intended to designate the existence of characteristics, numbers, steps, operations, constituent elements, and components described in the specification or a combination thereof, and do not exclude a possibility of the existence or addition of one or more other specific characteristics, numbers, steps, operations, constituent elements, and components, or a combination thereof in advance. It will be understood that when an element such as a layer, film, region, or substrate is referred to as being "on" another element, it can be directly on the other element or intervening elements may also be present. On the contrary, it will be understood that when an element such as a layer, film, region, or substrate is referred to as being "beneath" another element, it can be directly beneath the other element or intervening elements may also be present.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

Hereinafter, aspects of some example embodiments of the present invention are described in more detail with reference to the accompanying drawings.

FIG. 1 is a block diagram of a touch screen display device according to some example embodiments of the present invention.

Referring to FIG. 1, a touch screen display device 100 may perform a task in response to a touch operation that is detected on a display panel 160.

According to some embodiments, the touch screen display device 100 may include a processor 110, a touch sensor 130, a touch controller 120, an input/output interface 140, a display driver 150, the display panel 160, a memory controller 170, a memory 180 and a bus 190.

For example, the touch screen display device 100 may be embodied as a cellular phone, a smart phone, a personal digital assistant (PDA), an enterprise digital assistant (EDA), a digital still camera, a digital video camera, a portable multimedia player (PMP), a personal navigation device or a portable navigation device (PND), a mobile internet device (MID), a wearable computer, an organic light emitting display device, a liquid crystal display device, a plasma display device, or a quantum dot display device. However, the present invention is not limited thereto.

The processor 110 may perform calculations (e.g., predetermined calculations or tasks). For example, the processor 110 may be embodied as an integrated circuit (IC), an application processor (AP), a mobile AP, or a processor capable of controlling operations of the display driver 150. However, the present invention is not limited thereto.

The touch sensor 130 may recognize user's movements and convert these movements into an electrical signal.

The touch sensor 130 may be configured to detect a touch that is input by a user, generate a touch signal based on the detected touch, and supply the touch signal to the touch controller 120. The touch sensor 130 may sense a touch that is input by the user's body part or a stylus pen.

In addition, a touch may be input by the user by directly touching the touch screen display device 100 with a user's finger or like, or placing the finger near the touch screen display device 100.

For example, the touch sensor 130 may be embodied as one of a capacitive type touch sensor, a resistive type touch sensor, an optical touch sensor, a surface acoustic wave touch sensor, a pressure touch sensor and a hybrid touch sensor. However, the touch sensor 130 is not limited thereto.

The touch controller 120 may detect a position at which the touch is generated by using a touch signal supplied from the touch sensor 130. In addition, the touch controller 120 may transmit the detected touch position to the processor 110.

According to some example embodiments, the touch sensor 130 may be separated from the display panel 160 (e.g., located separately with respect to the display panel 160).

According to another example embodiment, the touch sensor 130 may be incorporated into the display panel 160 (e.g., integrated within the display panel 160).

The input/output interface 140 may supply an input signal from an input device connected to the touch screen display device 100 to the processor 110. For example, the input device may be embodied as a keyboard, a mouse, a microphone, or a touchpad, or any other suitable input device.

The display panel 160 may include a plurality of pixels and display an image thereon by using image data that is input from the processor 110. For example, the display panel 160 may be embodied as an organic light emitting display panel, a liquid crystal display panel, a plasma display panel, or the like. However, the present invention is not limited thereto.

The display driver 150 may control an image displaying operation of the display panel 160 by supplying a driving signal to the display panel 160.

The memory 180 may store image data supplied from the processor 110. For example, the memory 180 may be embodied as a non-volatile memory, such as electrically erasable programmable read-only memory (EEPROM), flash memory, magnetic RAM (MRAM), spin-transfer torque MRAM (MRAM), ferroelectric RAM (FeRAM), phase change RAM (PRAM), and resistive RAM (RRAM); or a volatile memory, such as random access memory (RAM), static RAM (SRAM), dynamic RAM (DRAM), synchronous DRAM (SDRAM), thyristor RAM (T-RAM), zero capacitor RAM (Z-RAM), and Twin Transistor RAM (TTRAM). However, the present invention is not limited thereto.

The memory controller 170 may write image data to the memory 180 in response to a write request output from the processor 110, or read the image data from the memory 180 in response to a read request.

The processor 110, the touch controller 120, the input/output interface 140, the display driver 150 and the memory controller 170 may communicate with each other through the bus 190.

For example, the bus 190 may be a Peripheral Component Interconnect (PCI) bus, a PCI Express bus, an advanced high performance bus (AMBA), an advanced high performance bus (AHB), an advanced peripheral bus (APB), or an AXI bus, or a combination thereof.

Figure 2:
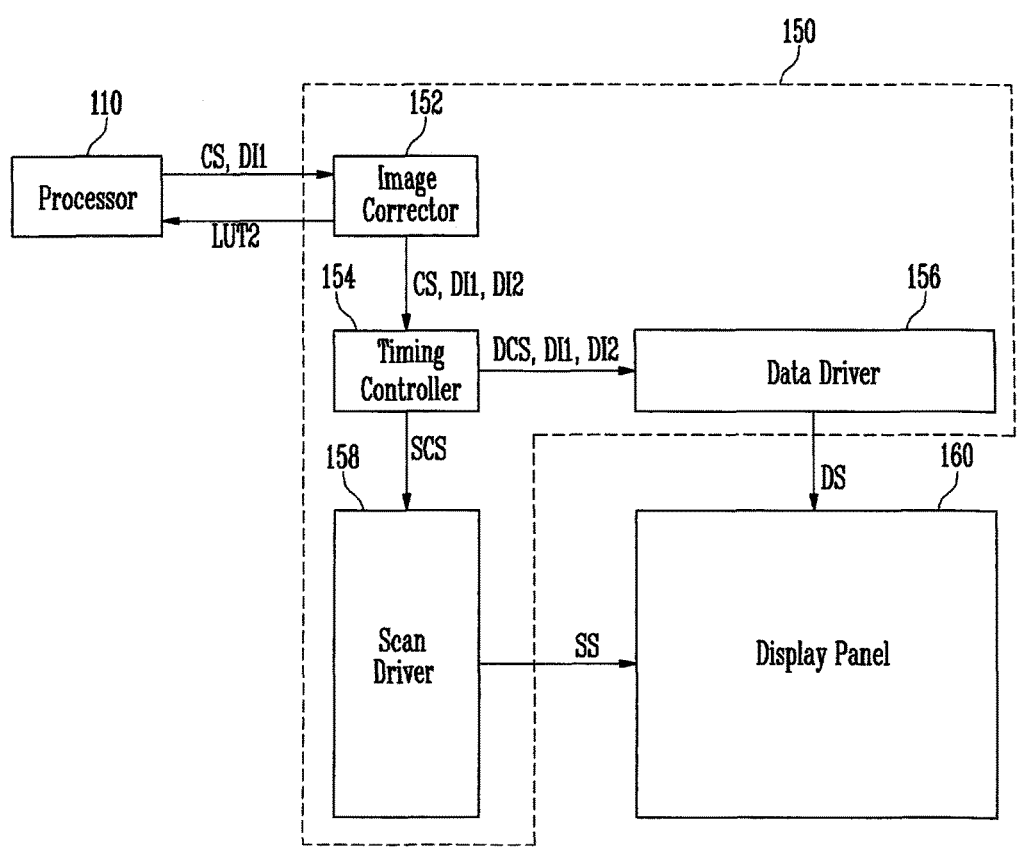
FIG. 2 is a block diagram of a processor, a display driver and a display panel according to some example embodiments of the present invention.

FIG. 2 is a block diagram of a processor, a display driver and a display panel according to an example embodiment.

Referring to FIG. 2, the processor 110 may supply first image data DI1 and a control signal CS to the display driver 150 and control a touch position by using a second lookup table LUT2 received from the display driver 150.

The display driver 150 may include an image corrector 152, a timing controller 154, a scan driver 158 and a data driver 156.

The image corrector 152 may generate second image data DI2 by using the first image data DI1 and the control signal CS supplied from the processor 110. In addition, the image corrector 152 may transfer the first image data DI1, the second image data DI2 and the control signal CS to the timing controller 154.

According to an example embodiment, the image corrector 152 may directly supply the first image data DI1, the second image data DI2 and the control signal CS to the data driver 156, not through the timing controller 154.

The image corrector 152 may generate the second lookup table LUT2 including a touch position corresponding to the second image data DI2. The image corrector 152 may transfer the generated lookup table LUT to the processor 110.

According to an example embodiment, the image corrector 152 may be separated from the display driver 150.

According to another example embodiment, the image corrector 152 may be incorporated into the timing controller 154, and the timing controller 154 may convert the first image data DI1 into the second image data DI2.

The timing controller 154 may receive the first image data DI1, the second image data DI2 and the control signal CS from the image corrector 152.

The timing controller 154 may generate timing control signals to control the scan driver 158 and the data driver 156 on the basis of the control signal CS.

For example, the timing controller 154 may generate a scan timing control signal SCS to drive the scan driver 158 and a data timing control signal DCS to control the data driver 156.

The data driver 156 may receive the data timing control signal DCS and the first and second image data DI1 and DI2 from the timing controller 154 to generate a data signal DS. In other words, the data driver 156 may generate the data signal DS on the basis of the first image data DI1, or the data signal DS on the basis of the second image data DI2.

In addition, the data driver 156 may supply the generated data signal DS to data lines.

According to some example embodiments, the data driver 156 may be directly mounted to the display panel 160.

The scan driver 158 may supply a scan signal SS to scan lines in response to the scan timing control signal SCS.

According to some example embodiments, the scan driver 158 may be directly mounted to the display panel 160.

The pixels of the display panel 160 may receive the data signal DS through the data lines when the scan signal SS is supplied thereto. Each of the pixels may emit light with brightness corresponding to the data signal DS.

For example, each of the pixels may receive the data signal DS generated on the basis of the first image data DI1 from the data driver 156. In addition, each of the pixels may receive the data signal DS generated based on the second image data DI2 from the data driver 156.

According to some example embodiments, the data driver 156 may be separated from the scan driver 158.

According to another example embodiment, the data driver 156 may be incorporated into the scan driver 158.

Figure 3:
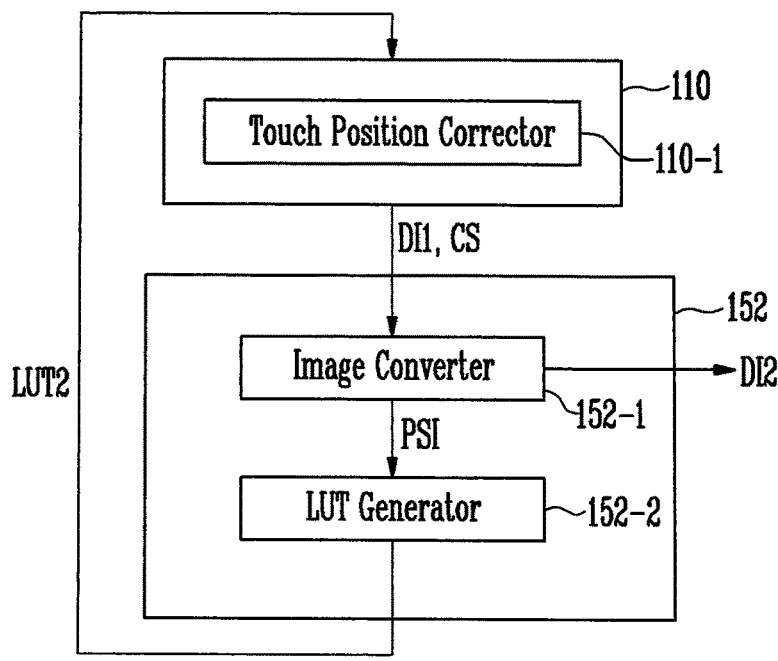
FIG. 3 is a block diagram of a processor and an image corrector shown in FIG. 2.
Figure 4:
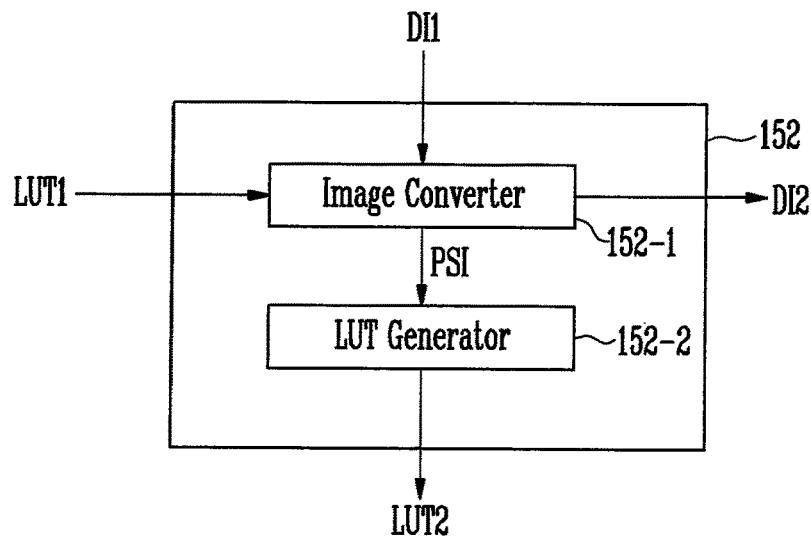
FIG. 4 is a block diagram of an image corrector shown in FIG. 3.

FIG. 3 is a block diagram of the processor and the image corrector shown in FIG. 2. FIG. 4 is a block diagram of the image corrector shown in FIG. 3.

Referring to FIG. 3, the image corrector 152 may include an image converter 152-1 and a lookup table generator 152-2.

The image converter 152-1 may convert the first image data DI1 into the second image data DI2 by performing a pixel shift operation.

Because the image converter 152-1 converts the first image data DI1 into the second image data DI2, an image displayed on the display panel 160 may be moved at regular or irregular periods to remove an afterimage generated on the display panel 160.

In other words, the image converter 152-1 may generate the second image data DI2 by moving an image based on the first image data DI1 in a direction (e.g., a predetermined direction) or in any direction.

The image converter 152-1 may transmit the second image data DI2 to the timing controller 154.

In addition, the image converter 152-1 may generate pixel shift information PSI including a shift amount and a shift direction of an image. For example, the pixel shift information PSI may include information about a distance from a first pixel driven corresponding to (or according to) data (e.g., predetermined data) of the first image data DI1 to a second pixel driven corresponding to (or according to) the data (e.g., the predetermined data) of the second image data DI2.

The image converter 152-1 may show the positions of the first pixel and the second pixel on the x coordinate and the y coordinate. The x-axis represents a horizontal axis of the display panel 160, and the y-axis represents a vertical axis of the display panel 160.

More specifically, the pixel shift information PSI may include an x-axis shift amount and a y-axis shift amount. The x-axis shift may refer to the distance by which the second pixel is separated from the first pixel in an x-axis direction, and the y-axis shift may refer to the distance by which the second pixel is separated from the first pixel in a y-axis direction.

In addition, the pixel shift information PSI may include an x-axis shift direction and a y-axis shift direction.

For convenience of explanation, the location of the first pixel may be referred to as a first touch position and the location of the second pixel may be referred to as a second touch position.

When the image converter 152-1 converts the first image data DI1 into the second image data DI2, the same operation may be necessarily performed when the user touches the second touch position as when the user touches the first touch position before the conversion.

For example, when the first image data DI1 is converted into the second image data DI2 by the pixel shift operation, the user may touch the second touch position according to the image displayed on the basis of the second image data DI2.

The touch screen display device 100 may perform a first operation when a touch operation is sensed at the first touch position. However, the touch screen display device 100 may not perform the first operation when a touch operation is sensed at the second touch position.

Therefore, the touch screen display device 100 may correct the second touch position into the first touch position when the first data DI1 is converted into the second image data DI2 by the pixel shift operation.

The lookup table generator 152-2 may generate the second lookup table LUT2 by using the pixel shift information PSI in order to correct the first touch position into the second touch position.

The second lookup table LUT2 may include an x-axis shift amount, an x-axis shift direction, a y-axis shift amount and a y-axis shift direction between the first touch position and the second touch position.

According to some example embodiments, the lookup table generator 152-2 may generate the second lookup table LUT2 including the first touch position and the second touch position.

According to another example embodiment, the lookup table generator 152-2 may generate pixel groups each including a plurality of pixels in order to reduce arithmetic complexity, and generate the second lookup table LUT2 to collectively correct the touch position of each of the pixels included in each of the pixel groups at a time.

The lookup table generator 152-2 may generate the second lookup table LUT2 whenever the image converter 152-1 converts the first image data DI1 into the second image data DI2.

According to some example embodiments, the lookup table generator 152-2 may generate the lookup table LUT at each period (e.g., each predetermined period).

The image corrector 152 may transfer the second lookup table LUT2 generated by the lookup table generator 152-2 to the processor 110.

Referring to FIG. 4, the image converter 152-1 may generate the pixel shift information PSI by using a first lookup table LUT 1 (e.g., a predetermined first lookup table LUT1).

The image converter 152-1 may determine to which frame data the first image data DI1 received from the processor 110 corresponds, and generate the second image data DI2 and the pixel shift information PSI with reference to the first lookup table LUT1 as a result of the determination.

The first lookup table LUT1 may include an x-axis shift amount, an x-axis shift direction, a y-axis shift amount and a y-axis shift direction of the first image data DI1 corresponding to the number of times the first image data DI1 received from the processor 110 is input.

For example, the first lookup table LUT1 may include a shift amount of a single pixel size in an +x direction and a shift amount of two pixel sizes in a +y direction with respect to the first to nth first image data DI1. When the image converter 152-1 receives the first image data DI1, the image converter 152-1 may generate the pixel shift information PSI including a shift amount of a single pixel size in an +x direction and a shift amount of two pixel sizes in a +y direction.

For convenience of explanation, the first lookup table LUT1 including the information about the first to n-th first image data DI1 is described above. However, it is only illustrative and embodiments of the present invention are not limited thereto.

Referring again to FIG. 3, the processor 110 may include a touch position corrector 110-1 which corrects a touch position according to a pixel shift operation.

The touch position corrector 110-1 may correct the second touch position into the first touch position by using the second lookup table LUT2 received from the image corrector 152.

In other words, the touch position corrector 110-1 may correct the second touch position into the first touch position according to the x-axis shift amount, the y-axis shift amount, the x-axis shift direction and the y-axis shift direction included in the second lookup table LUT2.

According to some example embodiments, the second lookup table LUT2 may include information about the pixel groups and information to correct of the touch position of each of the pixel groups. Therefore, the touch position corrector 110-1 may collectively correct a touch position corresponding to the second pixel group into a touch position corresponding to the first pixel group, so that it may not be necessary to calculate a corrected touch position corresponding to each pixel.

Figure 5:
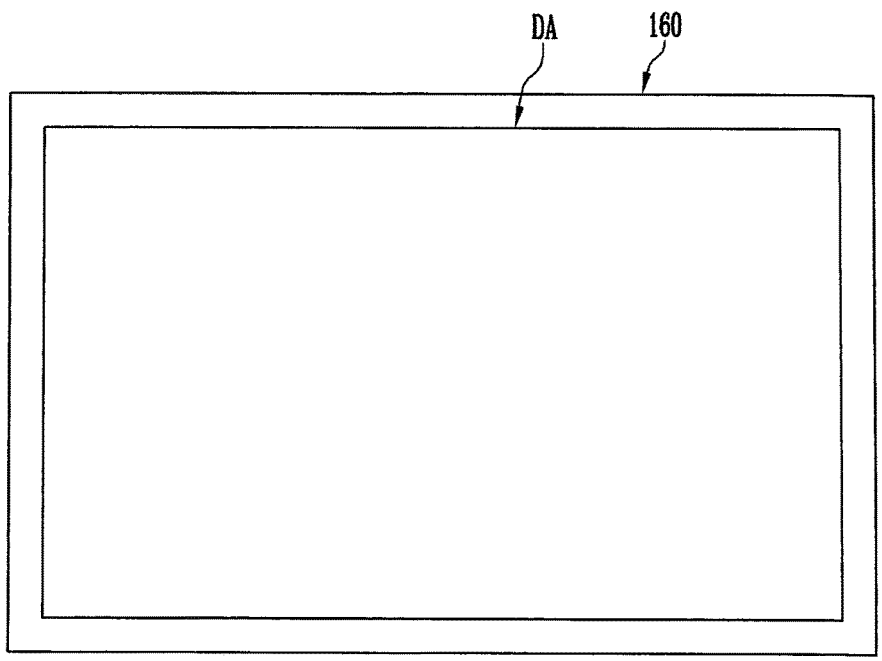
FIG. 5 is a conceptual view illustrating an image display region of a display panel according to some example embodiments of the present invention.
Figure 6:
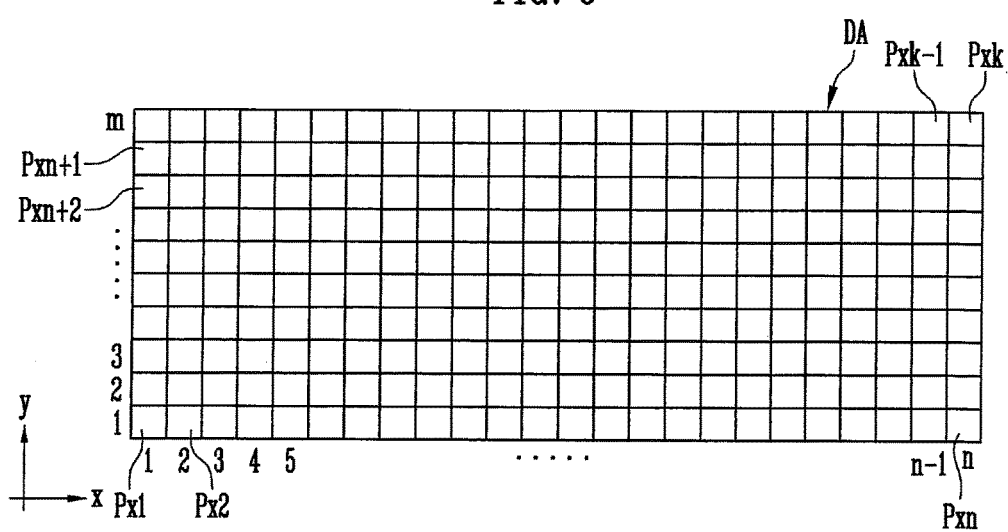
FIG. 6 is a conceptual view illustrating pixels included in an image display region shown in FIG. 5.

FIG. 5 is a conceptual view illustrating an image display region of a display panel according to an embodiment. FIG. 6 is a conceptual view illustrating pixels included in the image display region shown in FIG. 5.

Referring to FIGS. 5 and 6, the display panel 160 according to the inventive concept may include an image display region DA. A user of the touch screen display device 100 may view an image displayed on the image display region DA.

The image display region DA may include a plurality of pixels which emit light with brightness corresponding to the data signal DS. The image converter 152-1 may set the position of each of the pixels on the x-axis and y-axis coordinates.

The image converter 152-1 may set the first to n-th x-axis coordinates to pixels which are sequentially arranged in the +x-axis direction. In addition, first to m-th coordinates may be set to pixels which are sequentially arranged in the +y-axis direction.

For example, a pixel Px1, a pixel Px2, a pixel Pxn, a pixel Pxk−1 and a pixel Pxk may be set to coordinates (1, 1), coordinates (1,2), coordinates (1, n), coordinates (m, n−1) and coordinates (m, n), respectively.

According to some example embodiments, when the display panel 160 has a resolution of 1920×1080 pixels, an x-axis coordinate 'n' may be 1920 and a y-axis coordinate m' may be 1080.

Figure 7A:
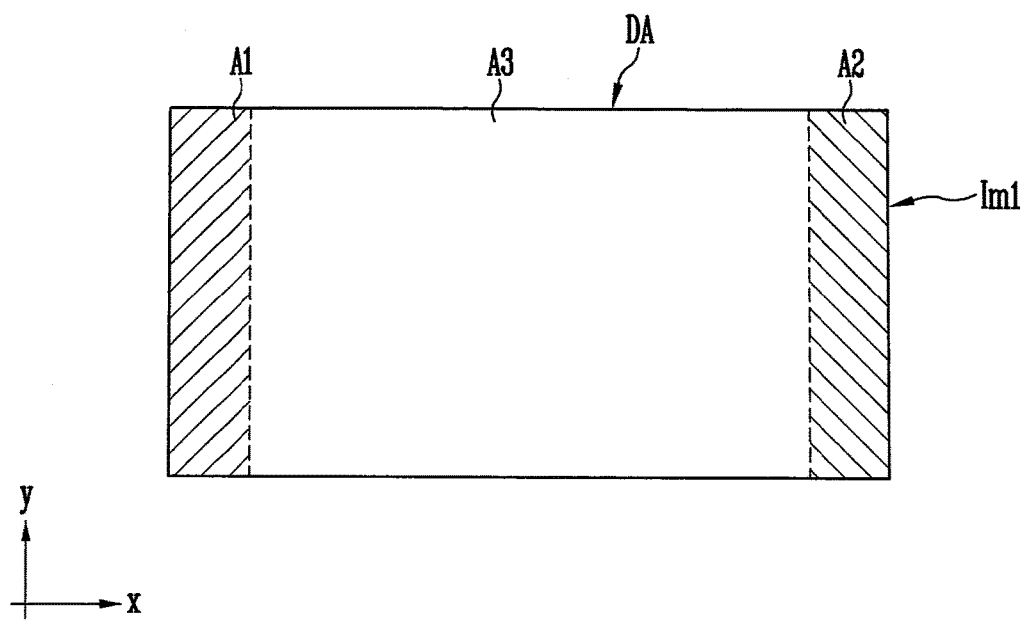
FIGS. 7A and 7B are conceptual views illustrating an x-axis image shift in an image display region according to some example embodiments of the present invention.
Figure 7B:
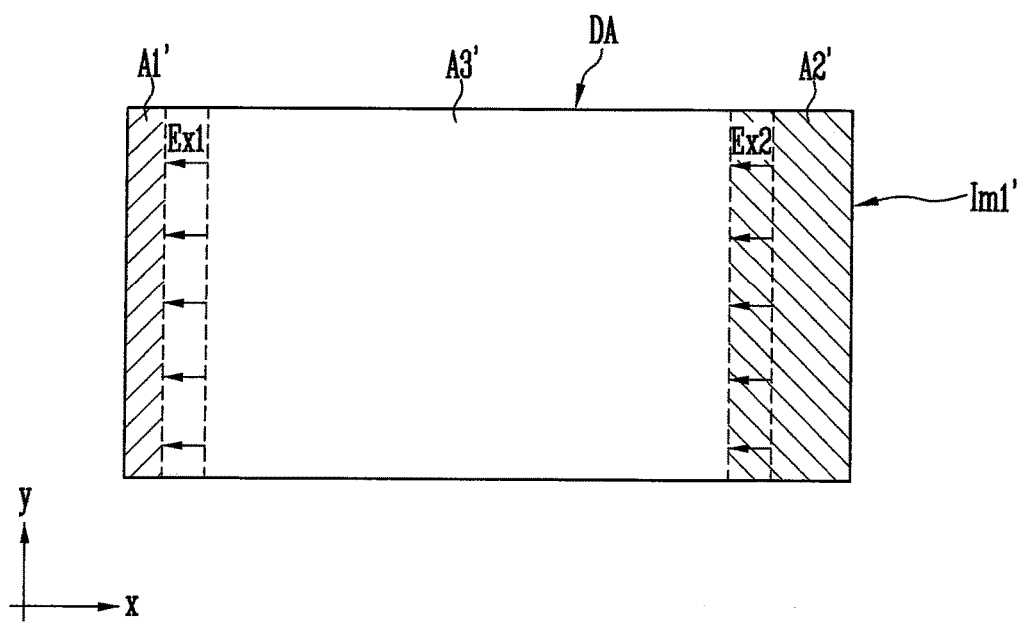

FIGS. 7A and 7B are conceptual views illustrating an x-axis image shift in an image display region according to some example embodiments.

Referring to FIG. 7A, the touch screen display device 100 may display an initial image Im1 based on the first image data DI1 in the image display region DA.

The image display region DA may include a plurality of regions. For example, the image display region DA may include a first region A1, a second region A2, and a third region A3.

The third region A3 may be located between the first region A1 and the second region A2, the first region A1 may be located in the −x direction of the third region A3, and the second region A2 may be located in the +x direction of the third region A3.

The touch screen display device 100 according to some example embodiments may display an image obtained by moving the initial image Im1 by a pixel shift operation. In other words, the touch screen display device 100 may reduce or enlarge the initial image Im1 displayed on the first, second and third regions A1, A2 and A3 in the image display region by a pixel shift operation.

Referring to FIG. 7B, the touch screen display device 100 may display a corrected image Im1' based on the second image data DI2 in the image display region DA. In other words, the touch screen display device 100 may display the corrected image Im1' obtained by moving the initial image Im1 by a pixel shift operation.

The image converter 152-1 according to some example embodiments may set the first region A1 as an x-axis reduced region and the second region A2 as an x-axis enlarged region.

The image converter 152-1 may reduce an area of the first region A1 by a first area Ex1 and enlarge an area of the second region A2 by a second area Ex2 according to values (e.g., predetermined values).

The first area Ex1 by which the first region A1 is reduced and the second area Ex2 by which the second region A2 is enlarged may be the same as each other.

According to an example embodiment, the image converter 152-1 may control the areas of the first region A1 and second region A2 according to the values included in the above-described first lookup table LUT1.

In other words, the initial image Im1 displayed on the first region A1 may be reduced by the first area Ex1 and displayed as the corrected image Im1' in a first region A1'. In addition, the initial image Im1 displayed in the second region A2 may be enlarged by the first area Ex1 and displayed in the second region A2'.

The image converter 152-1 may set the third region A3 as an x-axis shift region. The image converter 152-1 may set a third region A3' by moving the third region A3 in a direction in which the x-axis reduced region is located.

Therefore, the corrected image Im1' moved in the direction in which the x-axis reduced region is located may be displayed in the third region A3.

In other words, the touch screen display device 100 may perform a pixel shift operation by which each of the divided initial images may be reduced and enlarged. Therefore, the touch screen display device 100 may display the corrected image Im1' moved in a direction in which the initial image Im1 is reduced.

The entire area of the initial image Im1 and the entire area of the corrected image Im1' may be maintained to be the same (or substantially the same) size as each other.

Figure 8:
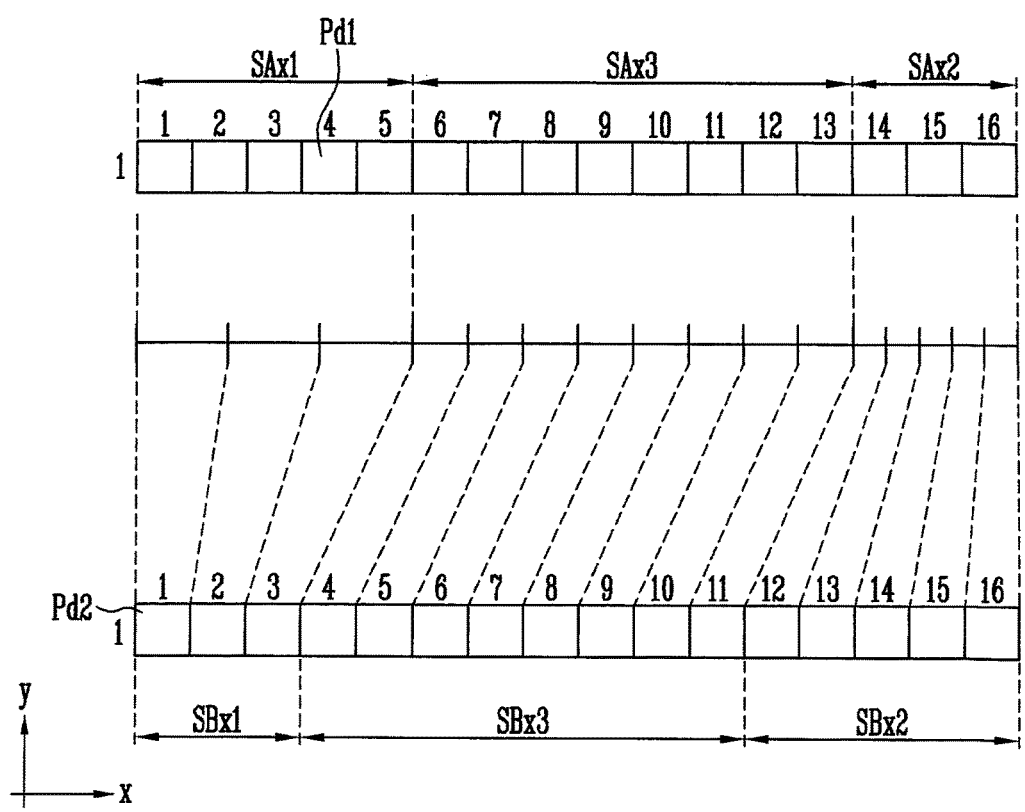
FIG. 8 is a conceptual view illustrating a method of generating second image data by an image corrector by an x-axis image shift according to some example embodiments of the present invention.

FIG. 8 is a conceptual view illustrating a method by which an image corrector according to an example embodiment generates second image data by an x-axis image shift.

FIG. 8 illustrates image data in an x-axis direction to be input to pixels in a row (pixels arranged in an x-axis direction) among the pixels shown in FIG. 6. As illustrated in FIG. 6, the number of pixels in one row is 'n.' However, for convenience of explanation, 16 (sixteen) pixels are arranged in one row.

The initial image Im1 may be displayed on the basis of image data Pd1, and the corrected image may be displayed based on image data Pd2. In addition, the first image data DI1 may include the image data Pd1, and the second image data DI2 may include the image data Pd2.

Referring to FIG. 8, the image converter 152-1 may divide the initial image Im1 into sub-regions SAx1, SAx2 and SAx3 in an x-axis direction. In addition, the image converter 152-1 may divide the corrected image Im1' into the sub-regions SBx1, SBx2 and SBx3 in the x-axis direction.

For example, the image converter 152-1 may set an image displayed on pixels from coordinates (1,1) to coordinates (1,5) arranged in the +x direction as the first sub-region SAx1. In addition, the image converter 152-1 may set the first sub-region SAx1 as the x-axis reduced region.

For example, the image converter 152-1 may set an image displayed on pixels from coordinates (1,6) to coordinates (1,13) arranged in the +x direction as the third sub-region SAx3. In addition, the image converter 152-1 may set the third sub-region SAx3 to the x-axis shift region.

For example, the image converter 152-1 may set an image displayed on pixels from coordinates (1,14) to coordinates (1,16) arranged in the +x direction as the second sub-region SAx2. In addition, the image converter 152-1 may set the second sub-region SAx2 as the x-axis enlarged region.

The image converter 152-1 may generate the image data Pd2 displayed on the sub-regions SBx1, SBx2, and SBx3 on the basis of the image data Pd1 displayed on the sub-regions SAx1, SAx2 and SAx3.

In other words, the image converter 152-1 may convert the image data Pd1 displayed on the first sub-region SAx1 into the image data Pd2 displayed on the first sub-reduced region SBx1.

In addition, the image converter 152-1 may convert the image data Pd1 displayed on the third sub-region SAx3 into the image data Pd2 displayed on the third sub-shift region SBx.

In addition, the image converter 152-1 may convert the image data Pd1 displayed on the second sub-region SAx2 into the image data Pd2 displayed on the second sub-enlarged region SBx2.

Figure 9:
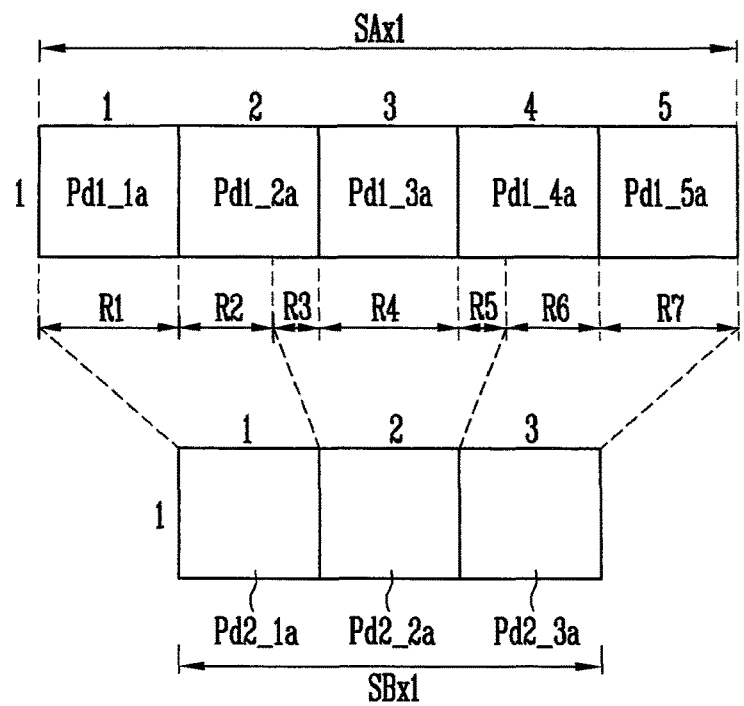
FIG. 9 is a conceptual view illustrating an x-axis reduced region shown in FIG. 8.
Figure 10:
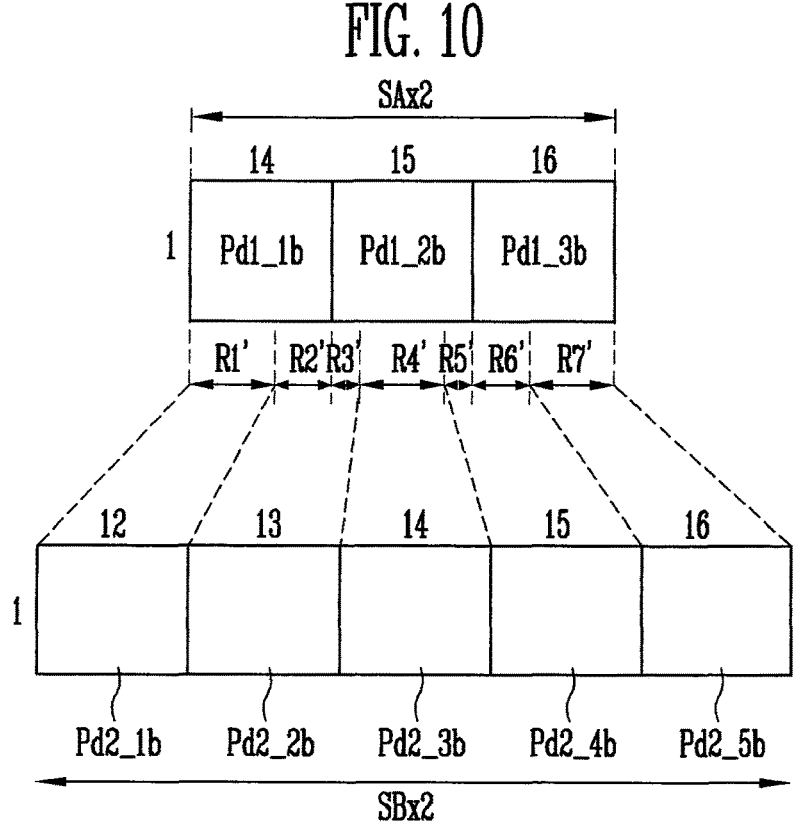
FIG. 10 is a conceptual view illustrating an x-axis enlarged region shown in FIG. 8.

FIG. 9 is a conceptual view illustrating the x-axis reduced region shown in FIG. 8. FIG. 10 is a conceptual view illustrating the x-axis enlarged region shown in FIG. 8.

Referring to FIGS. 8 and 9, the image converter 152-1 may generate the image data Pd2 on the basis of the image data Pd1 by the following equation:

$$Pd2 = sPd1 \times s.\text{ratio} + cPd1 \times c.\text{ratio} + ePd1 \times e.\text{ratio}$$

In the above equation, sPd1 may refer to image data displayed on a start pixel (corresponding to a pixel having the smallest x-axis coordinate value) in image data to be recombined, and s.ratio may be a start ratio of the image data displayed on the start pixel.

In addition, ePd1 may refer to image data displayed on an end pixel (corresponding to a pixel having the largest x-axis coordinate value) from image data to be recombined, and e.ratio may be an end ratio of the image data displayed on the end pixel.

In addition, cPd1 may refer to image data displayed on an intermediate pixel between the start pixel and the end pixel from the image data to be recombined, and c.ratio may be an intermediate ratio of the image data displayed on the intermediate pixel.

The start ratio, the end ratio and the intermediate ratio may be predetermined values.

For example, the image converter 152-1 may calculate image data Pd2_1a, Pd2_2a, and Pd2_3a by the following equation:

$$Pd2\_1a = Pd1\_1a \times R1 + Pd1\_2a \times R2$$

The image converter 152-1 may generate the image data Pd2_1a by using the image data Pd1_1a displayed on the start pixel, a start ratio R1, image data Pd1_2a displayed on the end pixel, and an end ratio R2.

In other words, the image converter 152-1 may generate the image data Pd2_1a displayed on the coordinates (1,1) by using the image data Pd1_1a displayed on the pixel at the coordinates (1,1) and part of the image data Pd1_2a displayed on the pixel at the coordinates (1,2).

Because there is no intermediate pixel between the start pixel and the end pixel, an equation regarding the intermediate pixel may be omitted.

$$Pd2\_2a = Pd1\_2a \times R3 + Pd1\_3a \times R4 + Pd1\_4a \times R5$$

The image converter 152-1 may generate the image data Pd2_2a by using the image data Pd1_2a displayed on the start pixel, a start ratio R3, image data Pd1_3a displayed on the intermediate pixel, an intermediate ratio R4, image data Pd1_4a displayed on the end pixel, and an end ratio R5.

In other words, the image converter 152-1 may generate the image data Pd2_2a displayed on the pixel at the coordinates (1,2) by using part of the image data Pd1_2a displayed on the pixel at the coordinates (1,2), the image data Pd1_3a displayed on the pixel at the coordinates (1,3), and part of the image data Pd1_4a displayed on a pixel at the coordinates (1,4).

$$Pd2\_3a = Pd1\_4a \times R6 + Pd1\_5a \times R7$$

The image converter 152-1 may generate image data Pd2_3a by using the image data Pd1_4a displayed on the start pixel, a start ratio R6, image data Pd1_5a displayed on the end pixel, and an end ratio R7.

In other words, the image converter 152-1 may generate the image data Pd2_3a displayed on the pixel at the coordinates (1,3) by using part of the image data Pd1_4a displayed on the pixel at the coordinates (1,4) and the image data Pd1_5a displayed on the pixel at the coordinates (1,5).

Because there is no intermediate pixel located between the start pixel and the end pixel, an equation regarding the intermediate pixel may be omitted.

The image converter 152-1 may calculate an x-axis touch shift amount by calculating the coordinates of the pixels displaying the image data Pd1 and the coordinates of the pixels displaying the image data Pd2.

The x-axis touch shift amount may be determined by the following equation:

$$x\_offset = xt1 - xt2$$

In the above equation, x_offset may refer to the x-axis touch shift amount, xt1 may refer to a first x-axis touch coordinate, and xt2 may refer to a second x-axis touch coordinate.

In addition, the first x-axis touch coordinate xt1 may refer to an x-axis coordinate of the first touch position, and the second x-axis touch coordinate xt2 may refer to an x-axis coordinate of the second touch position.

More specifically, the image converter 152-1 may select the image data Pd1 which has the highest ratio in the image data Pd2 and set the x-axis coordinate of the pixel displaying the image data Pd1 with the highest ratio as the first x-axis touch coordinate xt1.

In addition, the image converter 152-1 may set the x-axis coordinate of the pixel displaying the image data Pd2 as the second x-axis touch coordinate xt2.

The image converter 152-1 may calculate the x-axis touch shift amount by subtracting the second x-axis touch coordinate xt2 from the first x-axis touch coordinate xt1.

For example, the image converter 152-1 may calculate the x-axis touch shift amount x_offset with respect to the image data Pd2_1a. The image converter 152-1 may select the image data Pd1_1a having the highest ratio included in the image data Pd2_1a and set an x-axis coordinate (1) of the pixel displaying the image data Pd1_1a as the first x-axis touch coordinate xt1.

In addition, the image converter 152-1 may set the x-axis coordinate (1) of the pixel displaying the image data Pd2_1a as the second x-axis touch coordinate xt2. The image converter 152-1 may calculate the x-axis touch shift amount x_offset having a value of 0 (zero) by subtracting the second x-axis touch coordinate xt2 from the first x-axis touch coordinate xt1.

For example, the image converter 152-1 may select the image data Pd1_3a having a highest ratio in the image data Pd2_2a and set an x-axis coordinate (3) of the pixel displaying the image data Pd1_3a as the first x-axis touch coordinate xt1.

In addition, the image converter 152-1 may set the x-axis coordinate (2) of the pixel displaying the image data Pd2_2a as the second x-axis touch coordinate xt2. The image converter 152-1 may calculate the x-axis touch shift amount x_offset having a value of +1 by subtracting the second x-axis touch coordinate xt2 from the first x-axis touch coordinate xt1.

For example, the image converter 152-1 may select the image data Pd1_5a having the highest ratio in the image data Pd2_3a and set the x-axis coordinate (5) of the pixel displaying the image data Pd1_5a as the first x-axis touch coordinate xt1.

In addition, the image converter 152-1 may set the x-axis coordinate (3) of the pixel displaying the image data Pd2_3a as the second x-axis touch coordinate xt2. The image converter 152-1 may calculate the x-axis touch shift amount x_offset having a value of +2 by subtracting the second x-axis touch coordinate xt2 from the first x-axis touch coordinate xt1.

Referring to FIGS. 8 and 10, the image converter 152-1 may generate the image data Pd2 on the basis of the image data Pd1 according to the equation described with reference to FIG. 9.

The image data Pd2_1b, Pd2_2b, Pd2_3b, Pd2_4b, and Pd2_5b may be calculated using the ratios R1', R2', R3', R4', R5', R6', and R7' as follows:

$$Pd2\_1b = Pd1\_1b \times R1'$$

$$Pd2\_2b = Pd1\_1b \times R2' + Pd1\_2b \times R3'$$

$$Pd2\_3b = Pd1\_2b \times R4'$$

$$Pd2\_4b = Pd1\_2b \times R5' + Pd1\_3b \times R6'$$

$$Pd2\_5b = Pd1\_3b \times R7'$$

The method by which the image converter 152-1 calculates the image data Pd2_1b, Pd2_2b, Pd2_3b, Pd2_4b, and Pd2_5b may be substantially the same as the method of calculating the image data Pd2_1a, Pd2_2a, and Pd2_3a as described above with reference to FIG. 9. Thus, a detailed description thereof will be omitted.

In addition, the image converter 152-1 may calculate the x-axis touch shift amount with respect to the image data Pd2_1b, Pd2_2b, Pd2_3b, Pd2_4b, and Pd2_5b according to the equation described above with reference to FIG. 9.

For example, the image converter 152-1 may select image data Pd1_1b having the highest ratio in the image data Pd2_1b and set the x-axis coordinate (14) of the pixel displaying the image data Pd1_1b as the first x-axis touch coordinate xt1.

In addition, the image converter 152-1 may set the x-axis coordinate 12 of the pixel displaying the image data Pd2_1b as the second x-axis touch coordinate xt2. The image converter 152-1 may calculate the x-axis touch shift amount x_offset having a value of +2 by subtracting the second x-axis touch coordinate xt2 from the first x-axis touch coordinate xt1.

By the above-described method, the image converter 152-1 may calculate the x-axis touch shift amount x_offset having the value of +1 with respect to the image data Pd2_2, the x-axis touch shift amount x_offset having the value of +1 with respect to the image data Pd2_3b, the x-axis touch shift amount x_offset having the value of +1 with respect to the image data Pd2_4b, and the x-axis touch shift amount x_offset having the value of 0 with respect to the image data Pd2_5b.

Referring to FIG. 8, the image converter 152-1 may convert the image data Pd1 displaying the third sub-region SAx3 into the image data Pd2 displaying the third sub-shift region SBx.

For example, an image displayed on the pixels from the coordinates (1,6) to the coordinates (1,13) arranged in the +x direction may be displayed on the pixels from the coordinates (1,4) to the coordinates (1,11) by a pixel shift operation.

In other words, the image of the third sub-region SAx3 may be moved by two pixels in the −x direction.

The image converter 152-1 may calculate the x-axis touch shift amount x_offset with respect to the image data Pd2 displaying the third sub-shift region SBx according to the equation described above with reference to FIG. 9.

For example, the image converter 152-1 may calculate the x-axis touch shift amount x_offset by using the image data Pd2 displayed on the pixel at the coordinates (1,4) and the image data Pd1 displayed on the pixel at the coordinates (1,6).

In other words, the image converter 152-1 may set the x-axis coordinate (6) of the image data Pd2 as the first x-axis touch coordinate xt1 and set the x-axis coordinate (4) of the image data Pd1 as the second x-axis touch coordinate xt2. The image converter 152-1 may calculate the x-axis touch shift amount x_offset having a value of +2 by subtracting the second x-axis touch coordinate xt2 from the first x-axis touch coordinate xt1.

By the above-described method, the x-axis touch shift amount x_offset with respect to the image data Pd2 displayed on the pixels from the coordinates (1,4) to the coordinates (1,11) may be calculated.

The x-axis touch shift amount of the image data Pd2 corresponding to the third sub-shift region SBx may have the same value. In other words, the x-axis touch shift amount x_offset with respect to the image data Pd2 displayed on the pixels from the coordinates (1,4) to the coordinates (1,11) may have a value of +2.

Figure 11A:
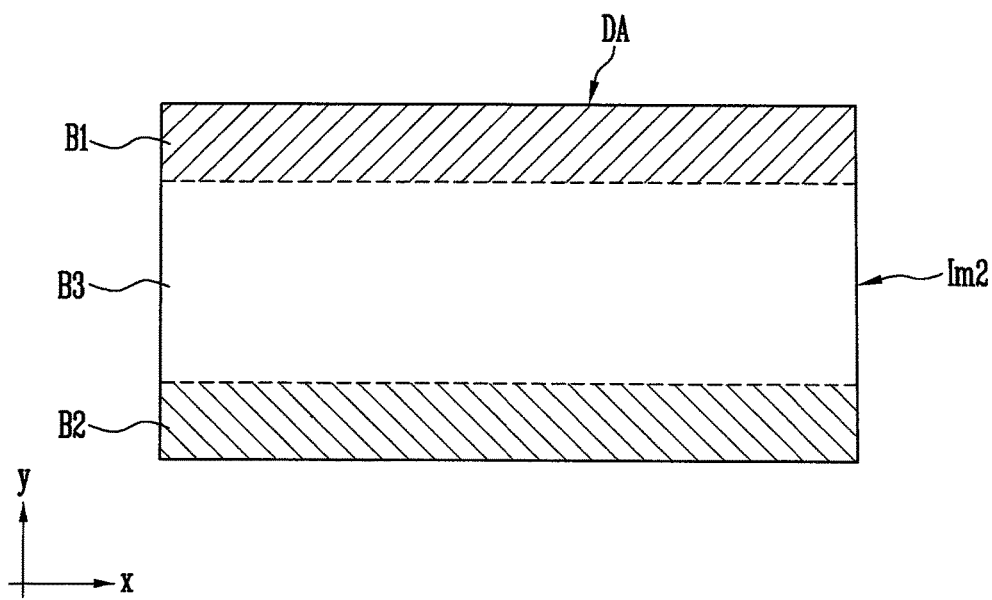
FIGS. 11A and 11B are conceptual views illustrating an x-axis image shift in an image display region according to some example embodiments of the present invention.
Figure 11B:
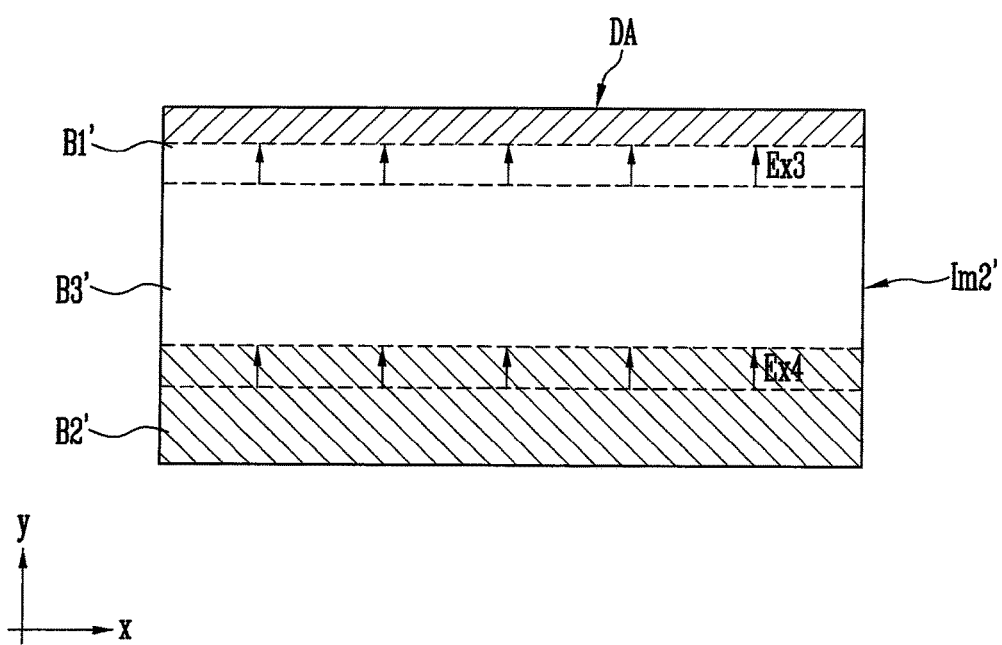

FIGS. 11A and 11B are conceptual views illustrating a y-axis image shift in an image display region according to an example embodiment of the present invention.

Referring to FIG. 11A, the touch screen display device 100 may display an initial image Im2 based on the first image data DI1 in the image display region DA.

The image display region DA may include a plurality of regions. For example, the image display region may include a first region B1, a second region B2, and a third region B3.

The third region B3 may be located between the first region B1 and the second region B2, the first region B1 may be located in the +y direction of the third region B3, and the second region B2 may be located in the −y direction of the third region B3.

The touch screen display device 100 according to an example embodiment may display an image obtained by shifting the initial image Im2 by performing a pixel shift operation. In other words, the touch screen display device 100 may reduce or enlarge the initial image Im2 displayed on the first, second, and third regions B1, B2, and B3 of the image display region DA by performing the pixel shift operation.

Referring to FIG. 11B, the touch screen display device 100 may display corrected image Im2' on the basis of the second image data DI2 in the image display region DA. In other words, the touch screen display device 100 may display the corrected image Im2' obtained by moving the initial image Im2 through the pixel shift operation.

The image converter 152-1 according to the example embodiment may set a first region B1' by setting the first region B1 as a y-axis reduced region and reducing the area of the first region B1 by a third area Ex3. The initial image Im2 displayed in the first region B1 may be reduced so that the corrected image Im2' may be displayed in the first region B1'.

In addition, the image converter 152-1 may set the second region B2 as a y-axis enlarged region and set the second region B2' by enlarging the area of the second region B2 by a fourth area Ex4. The initial image Im2 displayed in the second region B2 may be enlarged so that the corrected image Im2' may be displayed in the second region B2'.

The image converter 152-1 may set the third region B3 as a y-axis shift region. The image converter 152-1 may set a third region B3' by shifting the third region B3 in a direction in which the y-axis reduced region is located.

The above method by which the image converter 152-1 sets the first regions B1 and B1', the second regions B2 and B2' and the third regions B3 and B3' may be the same as the method of setting the first regions A1 and A1', the second regions A2 and A2', and the third regions A3 and A3' as described above with reference to FIGS. 7A and 7B. Thus, some repetitive description thereof will be omitted.

Figure 12:
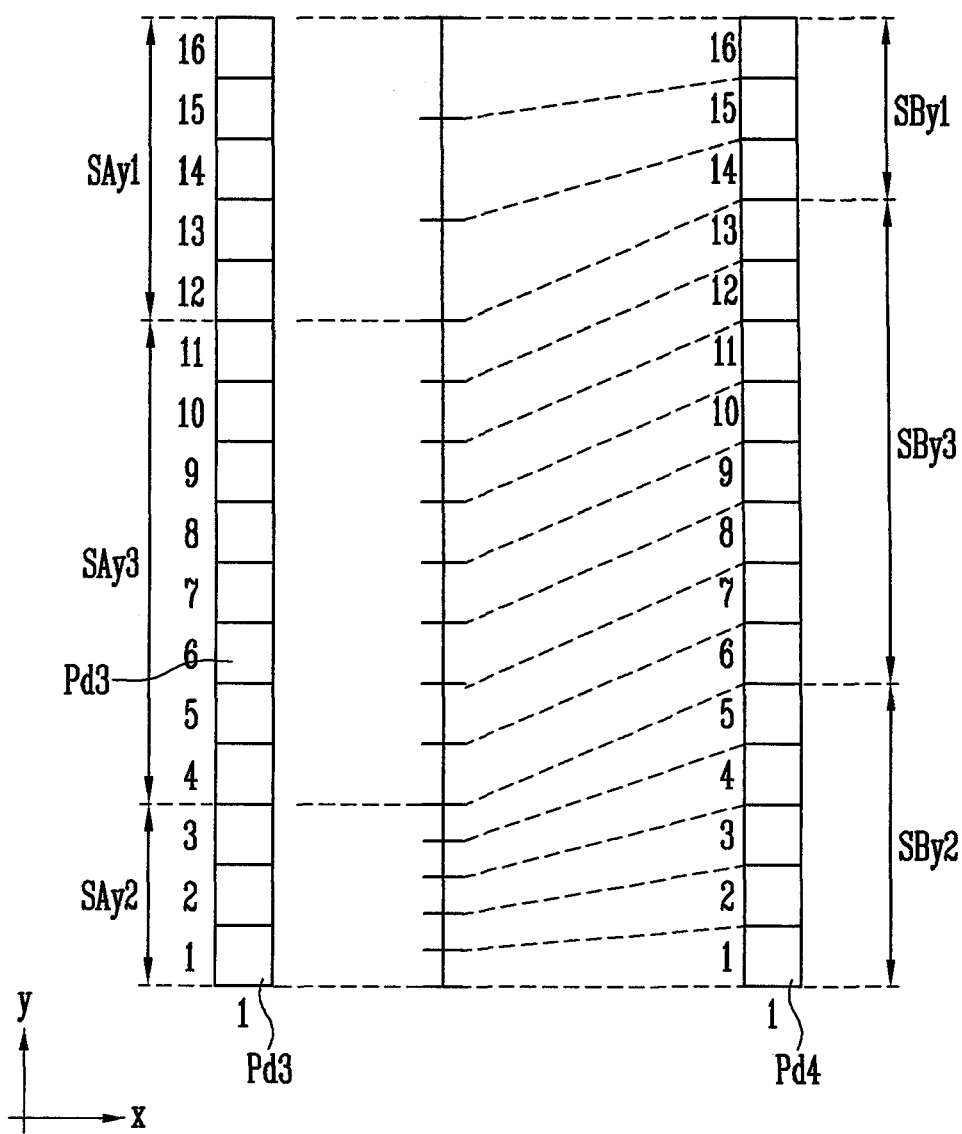
FIG. 12 is a conceptual view illustrating a method of generating second image data according to a y-axis image shift by an image corrector according to some example embodiments of the present invention.
Figure 13:
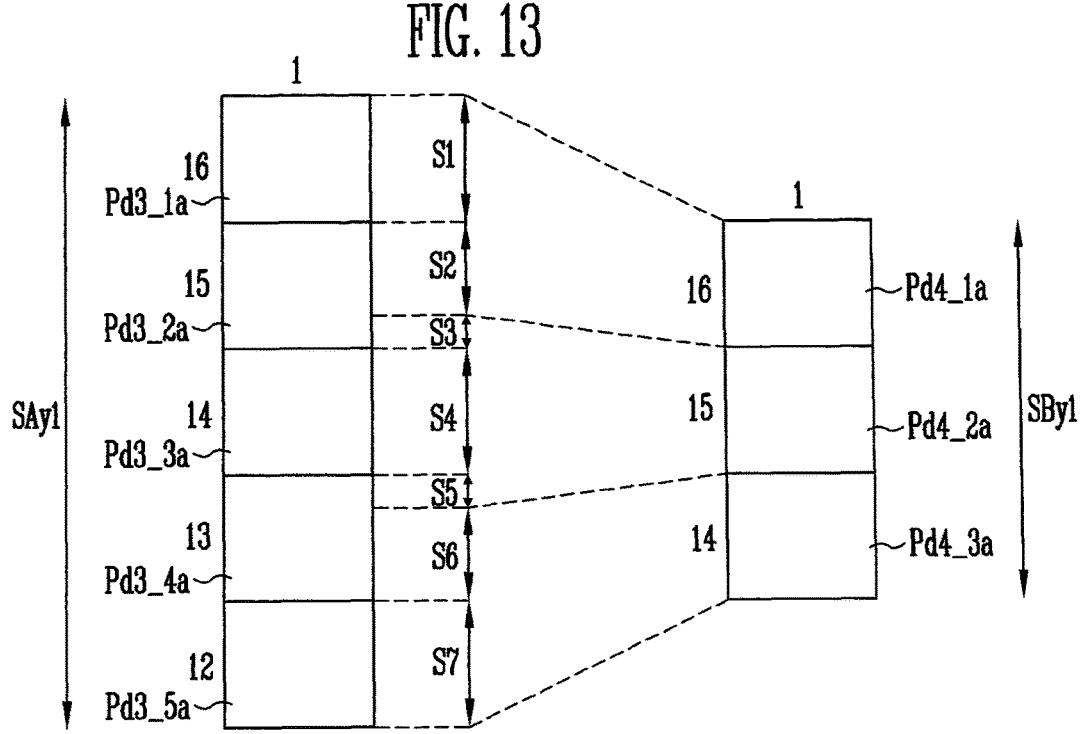
FIG. 13 is a conceptual view illustrating a y-axis reduced region shown in FIG. 12.
Figure 14:
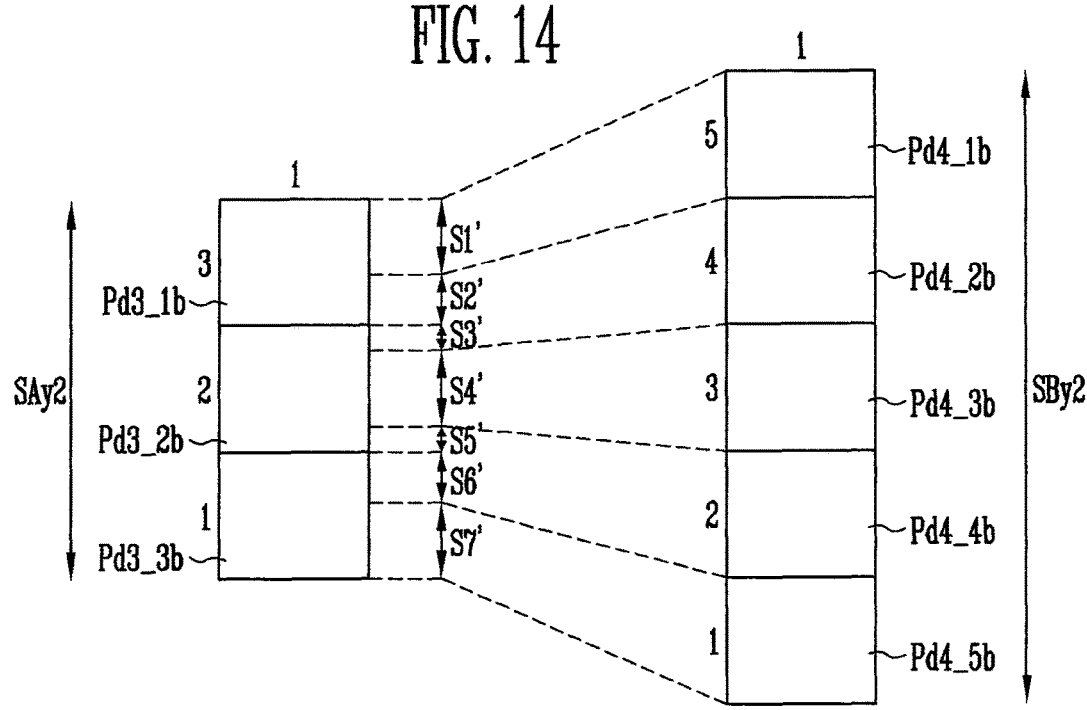
FIG. 14 is a conceptual view illustrating a y-axis enlarged region shown in FIG. 12.

FIG. 12 is a conceptual view illustrating a method by which an image corrector according to an example embodiment generates second image data by a y-axis image shift. FIG. 13 is a conceptual view illustrating the y-axis reduced region shown in FIG. 12. FIG. 14 is a conceptual view illustrating the y-axis enlarged region shown in FIG. 12.

FIG. 12 illustrates image data in a y-axis direction to be input to pixels in one row (pixels arranged in a y-axis direction), among the pixels shown in FIG. 6. There are 'm' pixels in one row as shown in FIG. 6. However, for convenience of explanation, FIG. 12 illustrates sixteen pixels in one row.

The initial image Im2 may be based on the image data Pd3, and the corrected image Im2' may be based on the image data Pd4. In addition, the first image data DI1 may include the image data Pd3, and the second image data DI2 may include the image data Pd4.

Referring to FIG. 12, the image converter 152-1 may divide the initial image Im2 into sub-regions SAy1, SAy2, and SAy3 in a y-axis direction. In addition, the image converter 152-1 may divide the corrected image Im2' into the sub-regions SBy1, SBy2 and SBy3 in the y-axis direction.

The above method by which the mage converter 152-1 divides the initial image Im2 into the sub-regions SAy1, SAy2, and SAy3 and the method by which the image converter 152-1 divides the corrected image Im2' into the sub-regions SBy1, SBy2 and SBy3 may be substantially the same as the method shown in FIG. 8. Thus, some repetitive description thereof will be omitted.

In addition, the method of generating the image data Pd4_1a, Pd4_2a, and Pd4_3a by using the image data Pd3_1a, Pd3_2a, Pd3_3a, Pd3_4a, and Pd3_5a and the ratios S1, S2, S3, S4, S5, S6, and S7 may be substantially the same as the method of generating the image data Pd2_1a, Pd2_2a, and Pd2_3a as shown in FIG. 9. Thus, some repetitive description thereof will be omitted.

In addition, the method of generating image data Pd4_1b, Pd4_2b, Pd4_3b, Pd4_4b, and Pd4_5b by using the image data Pd3_1b, Pd3_2b, and Pd3_3b and the ratios S1', S2', S3', S4', S5', S6', and S7' may be substantially the same as the method of generating the image data Pd2_1b, Pd2_2b, Pd2_3b, Pd2_4b, and Pd2_5b as shown in FIG. 10. Thus, some repetitive description thereof will be omitted.

The image converter 152-1 may calculate the y-axis touch shift amount by using the coordinates of the pixels displaying the image data Pd3 and the coordinates of the pixels displaying the image data Pd4.

The y-axis touch shift amount may be determined by the following equation:

$$y\_offset = yt1 - yt2$$

In the above equation, y_offset may be a y-axis touch shift amount, yt1 may be a first y-axis touch coordinate, and yt2 may be a second y-axis group coordinate.

In addition, a first y-axis touch coordinate yt1 may refer to a y-axis coordinate of the first touch position, and the second y-axis touch coordinate yt2 may be a y-axis coordinate of the second touch position.

The method by which the image converter 152-1 calculates the y-axis touch shift amount y_offset by setting the first y-axis touch coordinate yt1 and the second y-axis touch coordinate yt2 may be substantially the same as the method of calculating the x-axis touch shift amount x_offset as described in FIGS. 13 and 14.

According to the above equation, the image converter 152-1 may calculate the y-axis touch shift amount y_offset having a value of 0 with respect to the image data Pd4_1a, the y-axis touch shift amount y_offset having a value of −1 with respect to the image data Pd4_2a, and the y-axis touch shift amount y_offset having a value of −2 with respect to the image data Pd4_3a.

In addition, according to the above equation, the image converter 152-1 may calculate the y-axis touch shift amount y_offset having a value of −2 with respect to the image data Pd4_1b, the y-axis touch shift amount y_offset having a value of −1 with respect to the image data Pd4_2b, the y-axis touch shift amount y_offset having a value of −1 with respect to the image data Pd4_3b, the y-axis touch shift amount y_offset having a value of −1 with respect to the image data Pd4_4b, and the y-axis touch shift amount y_offset having a value of 0 with respect to the image data Pd4_5b.

FIG. 15 is a second lookup table according to an example embodiment.

Referring to FIG. 15, the image converter 152-1 may generate the pixel shift amount information PSI including the x-axis touch shift amount x_offset and the y-axis touch shift amount y_offset.

The lookup table generator 152-2 may generate the second lookup table LUT2 on the basis of the x-axis touch shift amount x_offset and the y-axis touch shift amount y_offset included in the pixel shift amount information PSI received from the image converter 152-1.

According to an example embodiment, the lookup table generator 152-2 may generate the second lookup table LUT2 by setting a pixel number Px_No. according to the arrangement of the pixels shown in FIG. 6 and setting the x-axis touch shift amount x_offset and the y-axis touch shift amount y_offset corresponding to the pixel number Px_No. of each of the pixels.

For example, the lookup table generator 152-2 may generate the second lookup table LUT2 by setting a pixel number of the pixel arranged at the coordinates (1,1) to Px1 and setting the x-axis touch shift amount x_offset and the y-axis touch shift amount y_offset each having the value of 0.

The touch position corrector 110-1 may correct the second touch position into the first touch position by using the second lookup table LUT2 received from the image corrector 152.

For example, when the second touch position of the pixel Px1 at the coordinates (1,1) is coordinates (1,1), the touch position corrector 110-1 may correct the touch position to (1,1) by using the x-axis touch shift amount x_offset and the y-axis touch shift amount y_offset each having the value of 0. When each of the x-axis touch shift amount x_offset and the y-axis touch shift amount y_offset has the value of 0, no substantial changes may not occur in the touch position.

In other words, when an image is shifted on the display panel 160 by pixel shift, if the user touches a position corresponding to the coordinates (1,1), the processor 110 may recognize that a touch operation is input on the pixel Px1 at the coordinates (1,1).

For example, when the second touch position on the pixel Px2 at the coordinates (2,1) is coordinates (2,1), the touch position corrector 110-1 may correct the second touch position to the coordinates (3,1) by using the x-axis touch shift amount x_offset having the value of +1 and the y-axis touch shift amount y_offset having the value of 0.

In other words, when the image is shifted on the display panel 160 by pixel shift, if a user touches a position corresponding to the coordinates (2,1), the processor 110 may recognize that a touch operation is input on the pixel at the coordinates (3,1).

FIG. 16 is a flowchart illustrating a driving method of a touch screen display device according to some example embodiments.

Referring to FIG. 16, the touch screen display device 100 may generate the second image data DI2 displayed on the second pixel on the basis of the first image data DI1 displayed on the first pixel (S100).

The touch screen display device 100 may generate the second lookup table LUT2 by using the positional relationship between the first pixel and the second pixel (S110).

The touch screen display device 100 may correct the second touch position on the second pixel into the first touch position on the first pixel on the basis of the positional relationship included in the second lookup table LUT2 (S120).

In a touch screen display device and a driving method thereof according to some example embodiments, instances of deterioration of pixels may be prevented or reduced by moving an image by a pixel shift operation, and instances of an afterimage generated on a display panel may be prevented or reduced.

In addition, in a touch screen display device and a driving method thereof according to some example embodiments, a touch position may be corrected by reflecting an x-axis touch shift amount and a y-axis touch shift amount included in a second lookup table. Therefore, the touch screen display device may accurately recognize a touch position according to a user's desired touch operation.

In addition, in a touch screen display device and a driving method thereof according to some example embodiments, because a processor changes a touch position according to an x-axis touch shift amount and a y-axis touch shift amount included in a lookup table, a separate arithmetic operation to change the touch position may be omitted. Therefore, the touch screen display device and the driving method thereof may reduce excessive time consumption resulting from the change of the touch position.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims, and their equivalents.

What is claimed is:

1. A touch screen display device, comprising:
    an image corrector configured to generate second image data based on first image data and to generate a second lookup table based on a positional relationship between a first pixel driven corresponding to predetermined data in the first image data and a second pixel driven corresponding to the predetermined data in the second image data;
    a data driver configured to generate a data signal based on the second image data;
    a display panel comprising pixels configured to emit light with a brightness corresponding to the data signal; and
    a processor configured to correct a second touch position on the second pixel to a first touch position on the first pixel based on the second lookup table.

2. The touch screen display device of claim 1, wherein the image corrector comprises:
    an image converter configured to generate the second image data based on the first image data and a first lookup table comprising a shift direction and a shift amount of an image, and pixel shift amount information by calculating a distance and a direction in which the second pixel is separated from the first pixel; and
    a lookup table generator configured to define the first touch position and the second touch position based on the pixel shift amount information and to generate the second lookup table according to a defined positional relationship therebetween.

3. The touch screen display device of claim 2, wherein the image converter is configured to calculate a number of inputs of the first image data and to determine the shift direction and the shift amount of the image in the first lookup table according to the number of inputs.

4. The touch screen display device of claim 2, wherein the image converter is configured to divide the image into a plurality of regions, and to set a first region among the plurality of regions as a reduced region, a second region as an enlarged region, and a third region between the first region and the second region as a shift region.

5. The touch screen display device of claim 4, wherein the image converter is configured to reduce the first region at a predetermined first ratio, to enlarge the second region at a predetermined second ratio, and to shift the third region in a direction in which the first region is reduced.

6. The touch screen display device of claim 2, wherein the image converter is configured to set a first x-axis touch coordinate and a first y-axis touch coordinate as an x-axis coordinate and a y-axis coordinate of the first touch position, respectively, and a second x-axis touch coordinate and a second y-axis touch coordinate as an x-axis coordinate and a y-axis coordinate of the second touch position, respectively.

7. The touch screen display device of claim 6, wherein the image converter is configured to calculate an x-axis touch shift amount and a y-axis touch shift amount by using the first x-axis touch coordinate, the first y-axis touch coordinate, the second x-axis touch coordinate, and the second y-axis touch coordinate, and to generate the pixel shift amount information comprising the x-axis touch shift amount and the y-axis touch shift amount.

8. The touch screen display device of claim 7, wherein the image converter is configured to calculate the x-axis touch shift amount according to an equation $x\_offset=xt1-xt2$, where the $x\_offset$ is the x-axis touch shift amount, the $xt1$ is the first x-axis touch coordinate, and the $xt2$ is the second x-axis touch coordinate.

9. The touch screen display device of claim 7, wherein the image converter is configured to calculate the y-axis touch shift amount according to an equation $y\_offset=yt1-yt2$, where the $y\_offset$ is the y-axis touch shift amount, the $yt1$ is the first y-axis touch coordinate, and the $yt2$ is the second y-axis touch coordinate.

10. The touch screen display device of claim 7, wherein the lookup table generator is configured to generate the second lookup table based on the x-axis touch shift amount and the y-axis touch shift amount.

11. The touch screen display device of claim 2, wherein the lookup table generator is configured to generate the second lookup table whenever the second image data is generated.

12. The touch screen display device of claim 1, wherein the processor comprises a touch position corrector configured to correct the second touch position based on the second lookup table.

13. The touch screen display device of claim 12, wherein the touch position corrector is configured to correct the second touch position into the first touch position based on an x-axis touch shift amount and a y-axis touch shift amount included in the second lookup table.

14. A method of driving a touch screen display device by correcting a touch position according to a shift of an image on a display panel, the method comprising:
    generating second image data displayed on a second pixel based on first image data display on a first pixel;
    generating a second lookup table based on a positional relationship between the first pixel and the second pixel; and
    correcting a second touch position on the second pixel into a first touch position on the first pixel based on the positional relationship in the second lookup table.

15. The method of claim 14, wherein the generating of the second image data comprises generating the second image data based on a first lookup table comprising a shift direction and a shift amount of the image based on the first image data.

16. The method of claim 14, further comprising generating pixel shift amount information by calculating a distance and a direction in which the second pixel is separated from the first pixel.

17. The method of claim 16, wherein the generating of the second lookup table comprises generating the second lookup table based on an x-axis touch shift amount and a y-axis touch shift amount included in the pixel shift amount information.

18. The method of claim 17, wherein the correcting of the second touch position comprises correcting the second touch position into the first touch position by moving the second touch position in x-axis and y-axis directions according to the x-axis touch shift amount and the y-axis touch shift amount included in the second lookup table.

\* \* \* \* \*